US006044752A

United States Patent [19]
Harigaya

[11] Patent Number: 6,044,752
[45] Date of Patent: Apr. 4, 2000

[54] HYDRAULIC CYLINDER UNIT

[75] Inventor: Takeo Harigaya, Saitama, Japan

[73] Assignee: Showa Corporation, Saitama, Japan

[21] Appl. No.: 09/135,091

[22] Filed: Aug. 17, 1998

[30] Foreign Application Priority Data

Mar. 20, 1998 [JP] Japan .................................. 10-071831

[51] Int. Cl.[7] ............................... F01B 31/00; F16J 10/04

[52] U.S. Cl. ............................................. 92/163; 92/171.1

[58] Field of Search .............................. 92/128, 163, 164, 92/169.1, 171.1

[56] References Cited

U.S. PATENT DOCUMENTS

| | | | |
|---|---|---|---|
| 2,401,378 | 6/1946 | Smith | 92/164 |
| 2,946,550 | 7/1960 | Wilde | 92/164 |
| 3,272,132 | 9/1966 | Stoelting et al. | 92/164 |
| 3,500,759 | 3/1970 | Potter et al. | 92/171.1 |
| 4,050,359 | 9/1977 | Mayer | 92/171.1 |
| 4,798,128 | 1/1989 | Mita | 92/171.1 |

*Primary Examiner*—F. Daniel Lopez
*Attorney, Agent, or Firm*—Dvorak & Orum

[57] ABSTRACT

An inner cylinder 6 is disposed in an outer cylinder 5, and the interior of the inner cylinder 6 is defined into an upper chamber a and a lower chamber b by a piston 3. A space between the outer cylinder 5 and the inner cylinder 6 defines an oil passage c which is communicated with the upper chamber a. A through hole-like plug which is attached to means P is formed in a bottom 5*a* of the outer cylinder 5. A female plug 11 and a male plug 12 are inserted from opposite ends of the plug accommodating means P, and a female screw portion 11*n* and a male screw portion 12*b* are formed on tip ends of the female plug 11 and the male plug 12, respectively, are threaded to each other. A recess 11*d* of the female screw 11*n* is brought into communication with the oil passage c through a first communication passage $R_1$, and a recess 12*d* of the male screw 12*n* is brought into communication with the lower chamber b through a second communication passage $R_2$.

4 Claims, 4 Drawing Sheets

HYDRAULIC CYLINDER UNIT

BACKGROUND OF THE INVENTION

1. Field of the Invention

The present invention relates to a hydraulic cylinder unit used as an actuator, and more particularly, to a simplified structural hydraulic cylinder providing simple maintenance and commonly used parts.

2. Description of the Related Art

The prior art shows a hydraulic cylinder unit 51 of a type, as shown in FIG. 4, in which oil is pumped from one end side of a cylinder to two oil chambers defined in the cylinder by a piston.

The hydraulic cylinder unit 51 comprises a cylinder body 52 including an outer cylinder 53, an inner cylinder 54, a lower cap 55 and an upper cap 56; and a piston 57 which is slidable in the inner cylinder 54. Oil is pumped from the side of the lower cap 55 to an upper chamber a and a lower chamber b (the piston 57 is at the maximum compression position, and b is indicated by a line) defined in the inner cylinder 54 by the piston 57.

That is, the lower cap 55 is provided with an upper chamber port 55*a* and a lower chamber port 55*b*. The upper chamber port 55*a* is communicated with an oil passage c formed between the outer and inner cylinders 53 and 54 through a first communication passage $R_1$, and the oil passage c is in communication with the upper chamber a through a communication passage Q of the upper cap 56.

The lower chamber port 55*b* is in communication with the lower chamber b through a second communication passage $R_2$.

In such a hydraulic cylinder unit 51, in order to move the piston 57 upward, a hydraulic oil is supplied from the lower chamber port 55*b* to increase the hydraulic pressure in the lower chamber b, and oil in the upper chamber a is discharged from the upper chamber port 55*a*, and in order to move the piston 57 downward on the contrary, hydraulic oil is supplied from the upper chamber port a, and oil in the lower chamber b is discharged from the lower chamber port 55*b*.

However, in this conventional structure, since the number of constituent parts of the cylinder body 52 is high, it takes much time to assemble the device. Further, since the upper chamber port 55*a*, the lower chamber port 55*b*, the first communication passage $R_1$ and the second communication passage $R_2$ are all integrally formed in the lower cap 55, there are problems due to complications in processing of the passages, the number of processing steps is high, the maintenance operation requires excessive time and labor, the cost is increased, and the lower cap is prone to be large in size.

Further, since a joint is threaded into the port portion, the port portion may be damaged if it is repeatedly attached and detached many times. In such a case, it is necessary to exchange the entire lower cap.

Furthermore, if it is necessary to vary a diameter of the inner cylinder, and to reduce a diameter of the piston, the entire inner cylinder must be integrally exchanged, and it is difficult to commonly use the parts.

SUMMARY OF THE INVENTION

It is an object of the present invention to downsize a hydraulic cylinder unit used as an actuator or the like to facilitate the manufacture of the hydraulic cylinder unit, and to permit parts thereof to be used commonly.

To achieve the above object, according to the present invention, there is provided a hydraulic cylinder unit, comprising a cylinder body having an inner cylinder inserted into an outer cylinder, and a piston slidably fitted into the inner cylinder, in which an interior of the inner cylinder is defined into a first oil chamber and a second oil chamber by the piston. A space between the outer and inner cylinders is defined as a communication passage which is in communication with the first oil chamber. The cylinder body is provided at its one end with a pumping port for pumping an oil to and from the first and second oil chambers, wherein the outer cylinder is provided at its bottom with a first communication passage which is in communication with an oil passage between the inner and outer cylinders. A second communication passage is in communication with the second oil chamber. A plug accommodating hole accommodates plugs which are brought into communication with the first and second communication passages. The plugs each have an oil passage which can be mounted to the plug accommodating hole.

If the outer cylinder is a bottomed cylinder, the number of constituent parts of the cylinder body is reduced, and the assembling operation is facilitated. If plugs having oil passages are connected to the bottomed plug accommodating hole, the first and second communication passages are simplified so that they can be formed easily, and maintenance can be easily carried out if the plugs are detached.

The plug accommodating hole is a single through hole which passes through the bottom of the outer cylinder in a direction perpendicular to the cylinder longitudinal axis, the plugs can be inserted into the plug accommodating hole from its opposite openings in a state where the plugs face each other, and a female screw and a male screw formed at tip ends of the plugs can be threaded to each other.

In this manner, when the plugs are accommodated in the plug accommodating hole, and the plug tips are threadedly attached in the through hole-like plug accommodating hole, the plug accommodating hole at the bottom can easily be formed, and it is unnecessary to form threads in the side of the plug accommodating hole.

Further, an attachment member which forms portions of the first and second communication passage may be inserted in a bottom side of the outer cylinder, and an inner surface of the inner cylinder can be tightly held by the attachment member.

If the attachment member is inserted, it is possible to shorten the length of each of the first and second communication passages which are to be formed in the bottom of the outer cylinder, and to provide a flexibility of selection of position of the communication passage, so that the cylinder unit can be made in compact form.

Further, since a diameter of the inner cylinder can be varied only by exchanging the attachment member, the outer cylinder can be used commonly.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to limit the present invention.

In the drawings.

DESCRIPTION OF THE PREFERRED EMBODIMENTS

Embodiments of the present invention will be explained based on the accompanying drawings below.

Figure 1:
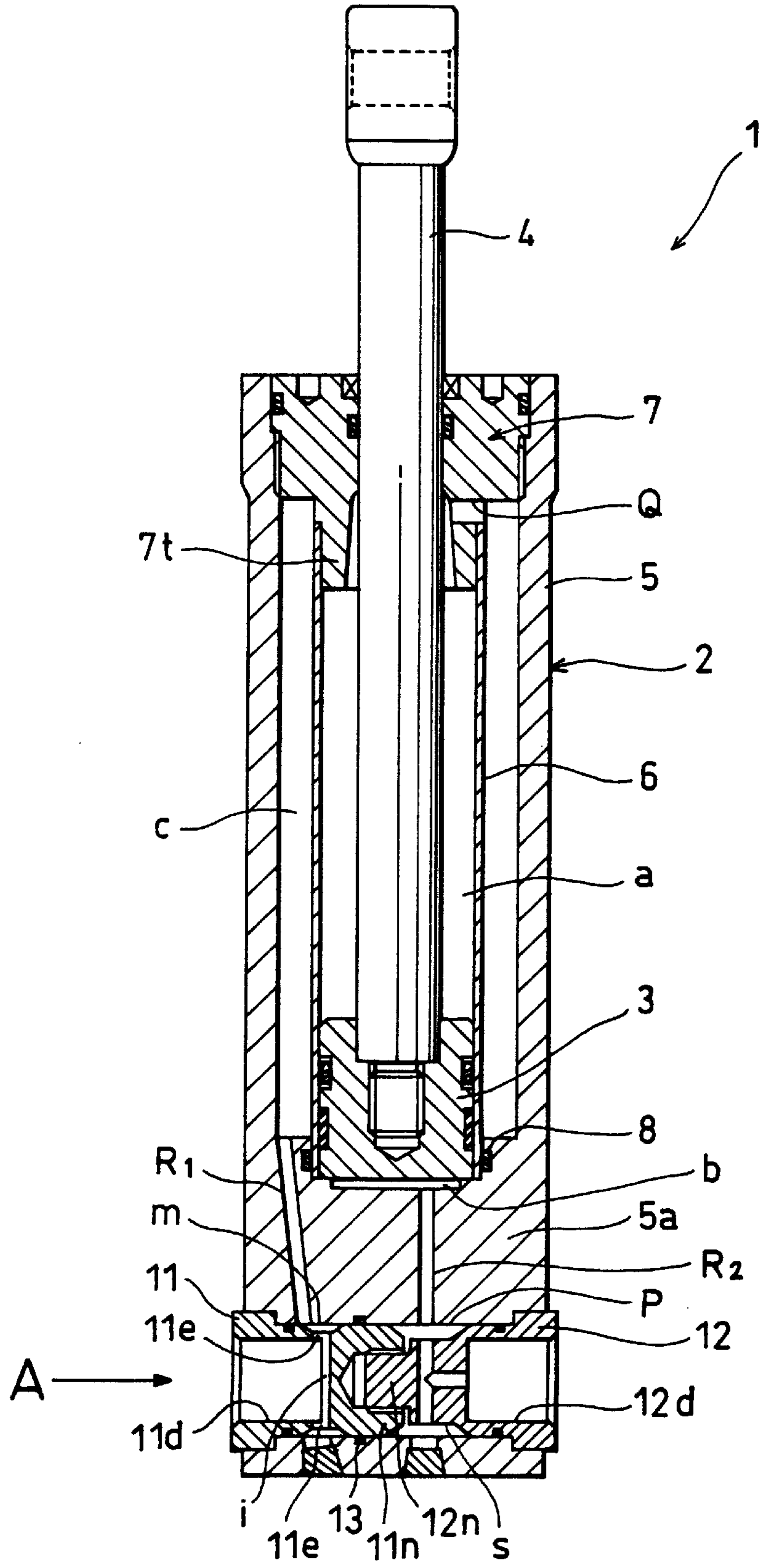
FIG. 1 is a vertical sectional view of a first example of constitution of a hydraulic cylinder unit according to the present invention.

As shown in FIG. 1, a hydraulic cylinder unit 1 is defined into two oil chambers by a piston, and oil can be pumped from one end side of a cylinder body 2 to the two oil chambers. The hydraulic cylinder unit 1 comprises the cylinder body 2 of a double cylinder structure, the piston 3 which slides in an inner cylinder 6 of the cylinder body 2, and a piston rod 4 is connected to the piston 3 and is extended outside of the upper cylinder body 2.

The cylinder body 2 comprises an outer cylinder 5 with an integral bottom 5*a*, and the inner cylinder 6 is inserted into the outer cylinder 5. An upper cap 7 covers upper openings of the cylinders 5 and 6. A lower end of the inner cylinder 6 is tightly fitted into a recess formed in an inner bottom of the outer cylinder 5 through a sealing member 8. An upper end of the inner cylinder 6 is fitted to a projecting fitting section 7*t* of the upper cap 7, where it is positioned and fixed.

An inner space of the inner cylinder 6 is defined into an upper chamber a as a first oil chamber and a lower chamber b as a second oil chamber by the piston 3. In the illustrated example, since the cylinder is in the maximum compressed state, the volume of the lower chamber b is extremely small.

The space between the outer cylinder 5 and the inner cylinder 6 is defined by an oil passage c for supplying and discharging oil to and from the upper chamber a. In order to connect the oil passage c and the upper chamber a, a communicating section Q is formed in a projecting fitting section 7*t* of the upper cap 7.

The bottom 5*a* of the outer cylinder 5 is formed with a plug accommodating hole P passing through a cylinder diametric axis. A pair of male and female and male plugs 11 and 12 are fitted in the plug accommodating hole P. A first communication passage $R_1$ is formed between the plug accommodating hole P and the oil passage c for bringing the plug accommodating hole P and oil passage c into communication with each other, and a second communication passage $R_2$ is formed between the plug accommodating hole P and the lower chamber b for bringing the plug accommodating hole P and lower chamber b into communication with each other.

The pair of female and male plugs 11 and 12 are assembled in the plug accommodating hole P so that tip ends of both the plugs 11 and 12 are threaded to each other. The tip end of the female plug 11 is formed with a female screw 11*n*, and the tip end of the male plug 12 is formed with a male screw 12*n*.

An outer peripheral portion of the base end of each of the female and male plugs 11 and 12 is formed with a large-diameter portion for restricting the extent of insertion, and end surfaces of the base end of the female and male plugs 11 and 12 are respectively provided with recesses 11*d* and 12*d* serving as pumping ports.

The outer periphery of the female plug 11 is provided with an annular groove m which is in communication with the first communication passage $R_1$, and communication holes lie and lie are formed between the annular groove m and the recess 11*d*. A sealing member 13 is mounted around the outer periphery of the female plug 11 closer to its tip end with respect to the annular groove m.

This sealing member 13 abuts against an inner surface of the plug accommodating hole P when the female plug 11 is assembled into the plug accommodating hole P so that the sealing member 13 and the inner surface of the plug accommodating hole P cut off the flow of the oil.

Figure 2:
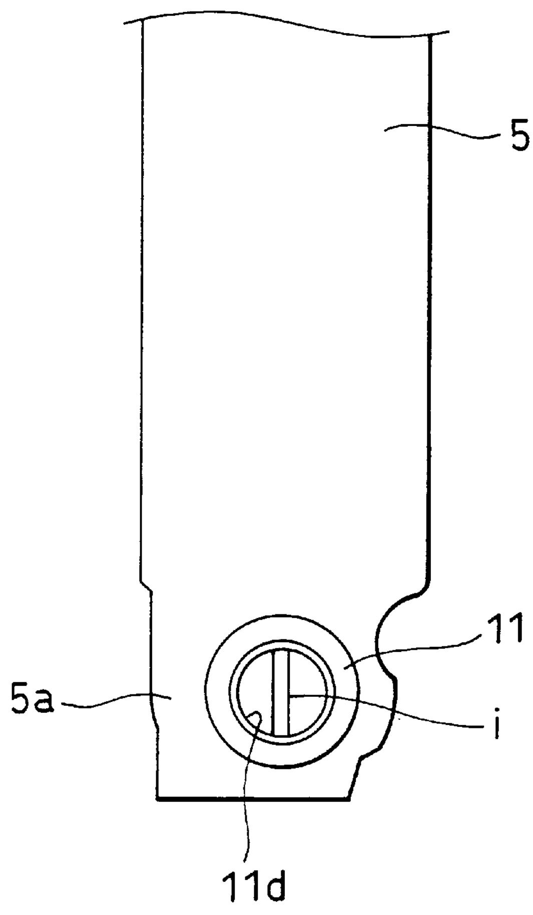
FIG. 2 is a view of a portion viewed from the direction A in FIG. 1.

The bottom of the recess 11*d* of the female plug 11 is formed with a fastening-tool groove i as shown in FIG. 2. The groove i is worked out when the communication holes 11*e* and 11*e* are formed.

The male plug 12 is provided at its tip end with a small-diameter portion s having a diameter smaller than the inner diameter of the plug accommodating hole P. The small-diameter portion s and the second communication passage $R_2$ can be communicated with each other, and a communication hole is provided between the small-diameter portion s and the recess 12*d*.

The female plug 11 and the male plug 12 are assembled so that the screws 11*n* and 12*n* of the female plug 11 and the male plug 12 are inserted from opposite side openings of the plug accommodating hole P. The screws 11*n* and 12*n* are abutted against each other. The female plug 11 is rotated by a screw driver utilizing the fastening-tool groove i, and both the plugs 11 and 12 are coupled in a predetermined position in the plug accommodating hole P.

In a pressing cylinder unit 1 having the above-described structure, the recess 11*d* of the female plug 11 is communicated with the upper chamber a in the inner cylinder 6 through the oil passage c, and the recess 12*d* of the male plug 12 is communicated with the lower chamber b in the inner cylinder 6. The piston 3 moved upward and downward by supplying the oil to the recesses 11*d* and 12*d*. The first and second communication passages $R_1$ and $R_2$ formed on the bottom 5*a* are simple in shape, formation thereof is easy, and the maintenance therefor can easily be carried out by removing the plugs 11 and 12.

A second example of a structure in which such a hydraulic cylinder unit 1 can be used to advantage will be explained based on FIG. 3. Elements similar to those described in the previous example are designated by the same reference numbers.

In this hydraulic cylinder unit 1A, an attachment member 14 is inserted into the cylinder of the outer cylinder 5, and a lower end of the inner cylinder 6 is held by the attachment member 14 so that the outer diameter of the outer cylinder 5 is reduced and thus, the outer cylinder 5 can be made more compact and at the same time, the parts can be used commonly.

The attachment member 14 includes a flange portion 14*f* having substantially the same diameter as the inner diameter of the outer cylinder 5, and a fitting portion 14*k* having substantially the same diameter as the inner diameter of the inner cylinder 6. A lower end surface of the inner cylinder 6 is supported by a flange end surface of the flange portion 14*f*, and an interior of the inner cylinder 6 is sealed tightly by a sealing member 15 mounted around an outer peripheral surface of the fitting portion 14*k*.

The attachment member 14 is formed with a first oil passage r1 constituting a portion of the first communication passage $R_1$, and a second oil passage $r_2$ constituting a portion of the second communication passage $R_2$. The first oil passage $r_1$ is formed by locally notching a portion of the flange portion 14*f*, and the second oil passage $r_2$ is formed as a through hole which passes through a center of the axis of the attachment member 14. A sealing member 16 is mounted around the second oil passage $r_2$ opened at a bottom of the attachment member 14, and the sealing member 16 is abutted against an inner bottom of the outer cylinder 5, thereby cutting off the flow of oil between the first and second communication passages $R_1$ and $R_2$.

With this design, it is unnecessary to provide a sealing member 8 outside the inner cylinder 6 for liquid-tightly sealing of the inside of the inner cylinder 6. The first communication passage $R_1$ can be disposed more inwardly so that the outer diameter of the outer cylinder 5 can be reduced, and the outer cylinder 5 can be made more compact. Further, the length of each of the first and second communication passages $R_1$ and $R_2$ formed on the bottom 5*a* is shortened, and working efficiency is further enhanced.

Furthermore, when the diameter of the inner cylinder 6 is varied, if it is replaced by the attachment member 14 having the fitting portion 14*k* of a different diameter, the same outer cylinder 5 can be used.

Figure 3:
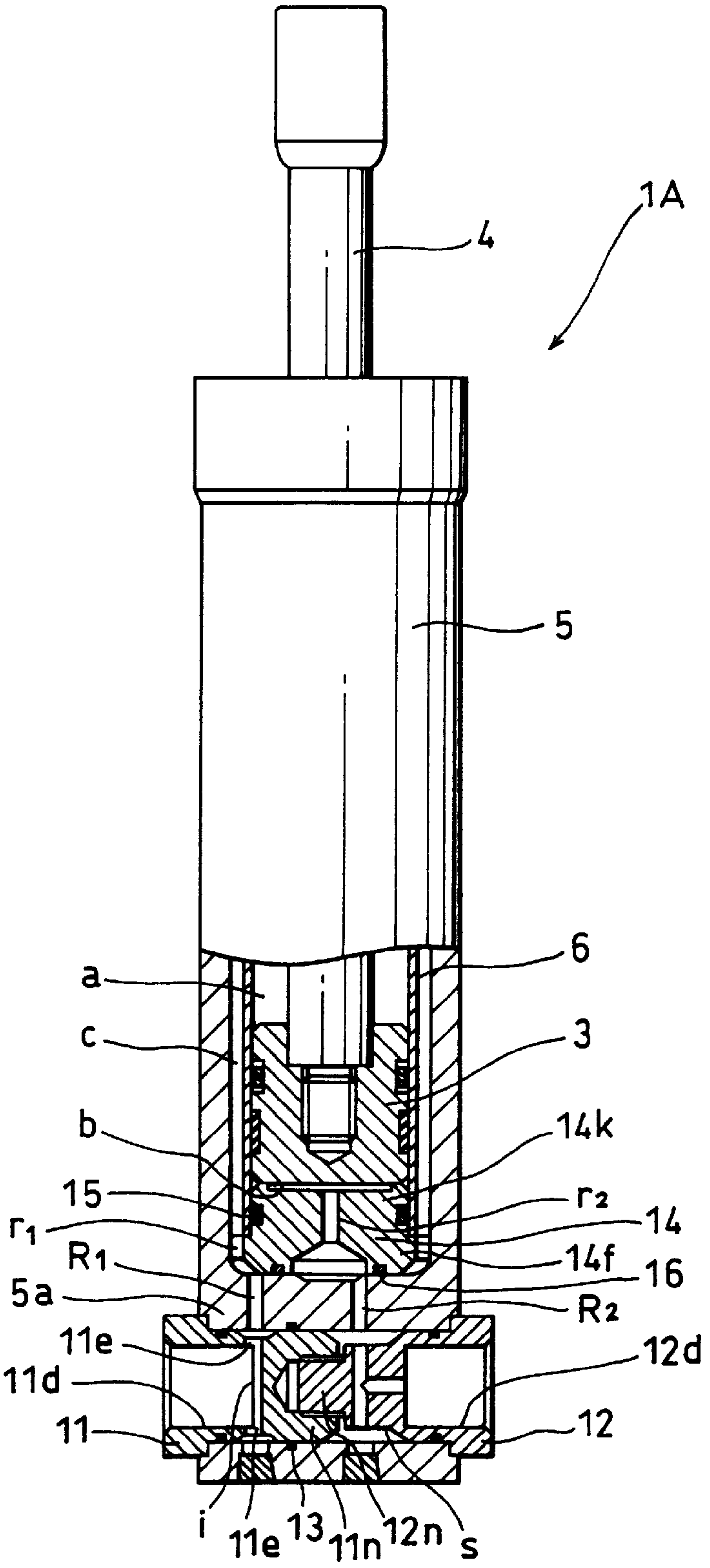
FIG. 3 is a vertical sectional view of a second example of constitution of a hydraulic cylinder unit according to the present invention.
Figure 4:
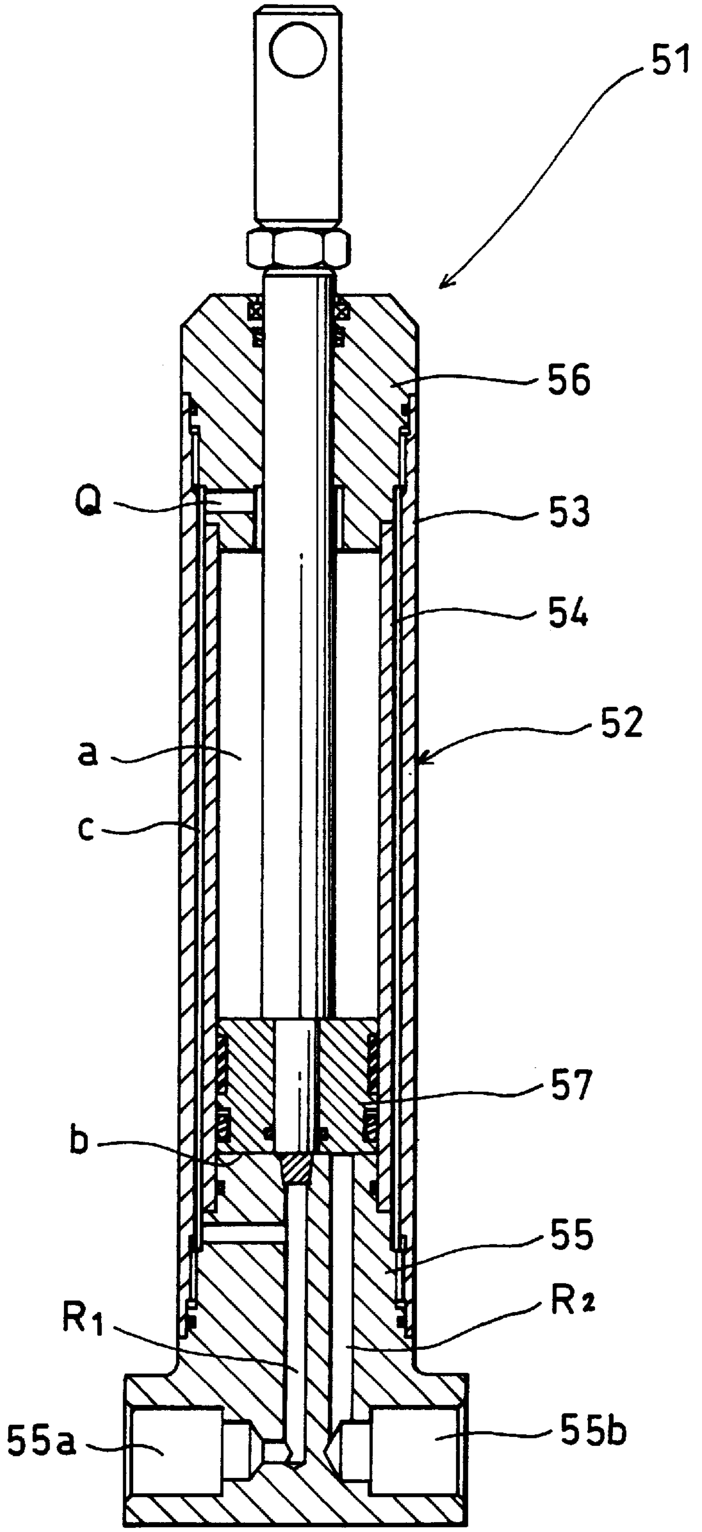
FIG. 4 PRIOR ART
FIG. 4 is a view showing prior art of the hydraulic cylinder unit.

Although the outer cylinder 5 is integrally provided with the bottom 5*a* in each of the embodiments shown in FIGS. 1 and 3, the bottom may be formed separately.

As described above, according to the present invention, in the hydraulic cylinder unit in which oil is pumped from one end side of the cylinder body to the first and second oil chambers defined in the inner cylinder by the piston, the first and second communication passages and the plug accommodating hole are provided in the bottom of the outer cylinder, and the plugs having oil passages are mounted to the plug accommodating hole. Therefore, assembling operation of the cylinder body is easy, and the first and second communication passages in the bottom are simplified so that they can be formed easily, and the maintenance can be easily carried out if the plugs are detached.

At that time, if the plug accommodating hole is a single through hole, and the plugs are inserted into the plug accommodating hole from its opposite openings in a state where the plugs face each other, and if a female screw and a male screw formed at tip ends of the plugs are threaded to each other, the plug accommodating hole at the bottom can easily be formed, and it is unnecessary to form a screw threads on the side of the plug accommodating hole.

If the attachment member is inserted in the bottom side of the outer cylinder, it is possible to shorten the length of each of the first and second communication passages which are to be formed in the bottom, and to achieve flexibility of selection of position of the communication passage, so that the cylinder unit can be made more compact.

Further, since the diameter of the inner cylinder can be varied merely by exchanging the attachment member, the outer cylinder can be used commonly.

While the preferred embodiments of the invention have been described in detail with reference to the drawings, they are by no means limitative, and various changes and modifications are possible without departing from the scope and spirit of the invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above but to include all possible embodiments which can be embodied within a scope encompassed and equivalents thereof with respect to the feature set out in the appended claims.

What is claimed is:

1. A hydraulic cylinder unit, comprising:

a cylinder body having an inner cylinder inserted into an outer cylinder and forming a space therebetween, said inner cylinder having an interior, a piston slidably fitted into said interior of said inner cylinder so as to divide said inner cylinder into a first oil chamber and a second oil chamber wherein said space between said outer and inner cylinders forms an oil passage which is in communication with said first oil chamber, said outer cylinder including a bottom end that is provided with a first communication passage in communication with said oil passage, a second communication passage which is in communication with said second oil chamber, and a plug accommodating means in communication with said first and second communication passages; and plugs mounted to said plug accommodating means, each having an oil passage and which are brought into communication with one of said first and second communication passages, wherein said plug accommodating means is a single throughbore formed through the bottom of said outer cylinder in a direction perpendicular to an outer cylinder axis, each of said plugs inserted into said hole from opposite ends so as to face each other, each of said plugs including respective tip ends having threads formed thereon wherein one of said tips includes male threads thereon and the other of said tips has female threads thereon, said female and male threads for interconnection.

2. The hydraulic cylinder unit according to claim 1, wherein said outer cylinder includes a bottom end which is integrally provided as a solid bottom.

3. The hydraulic cylinder unit according to claim 2, further comprising an attachment member which forms a respective portion of each said first and second communication passages and is inserted in said bottom end of said outer cylinder, said attachment member secured to an inner surface of said inner cylinder.

4. The hydraulic cylinder unit according to claim 1, further comprising an attachment member which forms a respective portion of each said first and second communication passages and is inserted in said bottom end of said outer cylinder, said attachment member secured to an inner surface of said inner cylinder.

* * * * *